United States Patent [19]

Buckley et al.

[11] Patent Number: 5,816,371
[45] Date of Patent: Oct. 6, 1998

[54] PRESSURE RELEASE PARKING BRAKE ACTUATOR

[75] Inventors: James A. Buckley, Whitefish Bay; James J. Dimsey, Brown Deer; Daniel B. Conine, Milwaukee; Terry L. Kent, Thiensville, all of Wis.

[73] Assignee: Hayes Industrial Brake, Inc., Mequon, Wis.

[21] Appl. No.: 647,567

[22] Filed: May 14, 1996

[51] Int. Cl.⁶ ..................................................... F16D 65/12
[52] U.S. Cl. ........................... 188/170; 188/1.11; 303/71; 92/130 A
[58] Field of Search ....................... 188/1.11 E, 1.11 WE, 188/72.3, 106 F, 170, 171, 195; 303/9.76, 71; 92/63, 130 A; 116/202, 204, 208

[56] References Cited

U.S. PATENT DOCUMENTS

| | | | |
|---|---|---|---|
| 3,557,665 | 1/1971 | Lowis | 188/170 |
| 3,964,794 | 6/1976 | Scholz | 188/195 |
| 3,977,304 | 8/1976 | Meissner | 92/130 A |
| 3,985,210 | 10/1976 | Hodge et al. | 188/170 |
| 4,458,791 | 7/1984 | Schneider et al. | 188/170 |
| 4,550,953 | 11/1985 | Bartholomew | 303/71 |
| 4,824,178 | 4/1989 | Petersen | 303/71 |
| 5,033,592 | 7/1991 | Metzelfeld . | |
| 5,118,165 | 6/1992 | Latvala | 188/170 |
| 5,558,411 | 9/1996 | Kanjo et al. | 188/170 |

FOREIGN PATENT DOCUMENTS

| | | | |
|---|---|---|---|
| 2491416 | 4/1982 | France | 188/170 |

*Primary Examiner*—Robert J. Oberleitner
*Assistant Examiner*—Chris Schwartz
*Attorney, Agent, or Firm*—Foley & Lardner

[57] ABSTRACT

An apparatus for maintaining hydraulic pressure in a spring applied hydraulicly released brake actuator and activating a parking brake light upon stroking the actuator to apply the parking brake in the system, the apparatus including a housing, a compression spring axially aligned in the housing, a cap mounted on one end of the housing, a cylinder formed in the cap, a piston mounted in the cylinder, a spring cup operatively connecting the piston to the compression spring, the piston rod being operatively connected to the piston and to the brake, a tubular housing having a magnetic switch at each end axially aligned with the piston rod, and a cylindrical tube having a magnet mounted thereon aligned with the tubular housing for actuating one or the other of the magnetic switches, one of the switches being actuated on a drop of pressure in the system and the other switch being operatively connected to a parking brake light to signal a loss of pressure in the system and actuation of the parking brake. In an alternate embodiment of the switch assembly a cylindrical magnet is centered in the cylindrical member and axially aligned with an actuating rod, a pair of switches are mounted in axial alignment in the cylindrical member with sufficient clearance between the actuating rod and the cylindrical magnet to allow for a large angular movement while maintaining close magnet to switch proximity throughout the full stroke of the rod.

6 Claims, 5 Drawing Sheets

5,816,371

PRESSURE RELEASE PARKING BRAKE ACTUATOR

FIELD OF THE INVENTION

The present invention relates to a spring applied hydraulic released parking brake system and more particularly to a first magnetic switch for activating a pump on sensing an excessive piston rod movement and a second magnetic switch for activating a parking brake light upon application of the parking brake.

BACKGROUND OF THE INVENTION

In U.S. Pat. No. 5,033,592, entitled "Spring Applied/ Pressure Release Emergency Brake Actuator," issued on Jul. 23, 1991, an emergency brake actuator is described which includes an independent piston and cylinder assembly with an independent precompressed spring assembly. The piston and cylinder assembly and precompressed spring assembly are constructed and arranged to be assembled and disassembled without releasing the precompressed spring assembly. The piston and cylinder assembly is mounted within the canister in a coaxial relation to the spring or springs. The springs are seated on a plate at one end of the canister and the other end is seated in a cup which is operatively connected to the piston and cylinder assembly to allow for full compression of the springs when the piston and cylinder assembly is pressurized. On a loss of pressure the parking brake is actuated to set the brake.

SUMMARY OF THE PRESENT INVENTION

The brake system according to the present invention maintains the pressure in the brake system during normal operation but, if the pressure is released the parking brake will apply and a parking light will illuminate, indicating the application of the brake. The system generally includes a cylindrical steel housing having a spring seated on a spring retainer in one end of the housing. A spring cup is seated on the other end of the spring. An end cap is mounted on the other end of the housing and is provided with a cylinder which is connected to the hydraulic brake pressure system. A piston is provided in the cylinder in abutting relation to the spring cup. A piston rod having a head at one end is axially aligned in the steel housing with the head end seated in an opening in the spring cup and the other end connected to a lever arm for a brake assembly. In one embodiment a magnet is provided on a tubular member which is aligned with the piston rod for movement between on and off positions with respect to a pair of magnetic switches mounted on a tubular member in the steel cylinder. The number of switches is based on the desired operation of the switch assembly.

One of the primary advantages of this arrangement is the ability of the pressure of the brake fluid to retain the actuator in the parking brake off position.

A particularly important feature of the invention is the provision of a switch assembly which is completely sealed.

A further feature of the invention is the immediate reaction of the switch assembly on a loss in pressure in the system to set the parking brake.

An important feature of the invention is the mounting of the magnet for the rod so that it is guided on its outer diameter by the inner diameter of the switch tube allowing the rod to move within the inner diameter of the magnet. The magnet is also retained axially about the piston rod by a retainer such that it can be positioned on the rod at final assembly and the tolerances of the other components will not influence the switch contact locations. This magnet design also allows its magnetic field to be canted giving a larger switch hysteresis. The switch can also be canted allowing for the switch hysteresis to be changed.

The switch assembly not only turns the pump on and off, it also indicates the application of the parking brake. In addition, the parking light will not stay illuminated if the stroke exceeds a predetermined point indicating brake overstroke and a need for maintenance or adjustment.

In addition to the above advantages, the overall function of the magnetic switch assembly is that it allows the stroke of the hydraulic piston to a predetermined position before actuating the pump in the system, thereby maintaining the life of the pump by reducing pump cycle frequency. The parking brake will be applied, and the parking brake light will be illuminated when the stroke exceeds a predetermined amount. If a loss in fluid pressure occurs because of a failure in the system or the deactivation of the system by the external parking brake switch the parking brake light will be illuminated. All of these items can be tailored to a specific application by locating the switches and the magnet accordingly.

Other principal features and advantages of the invention will become apparent to those skilled in the art upon review of the following drawings, the detailed description and the appended claims.

Figure 1:
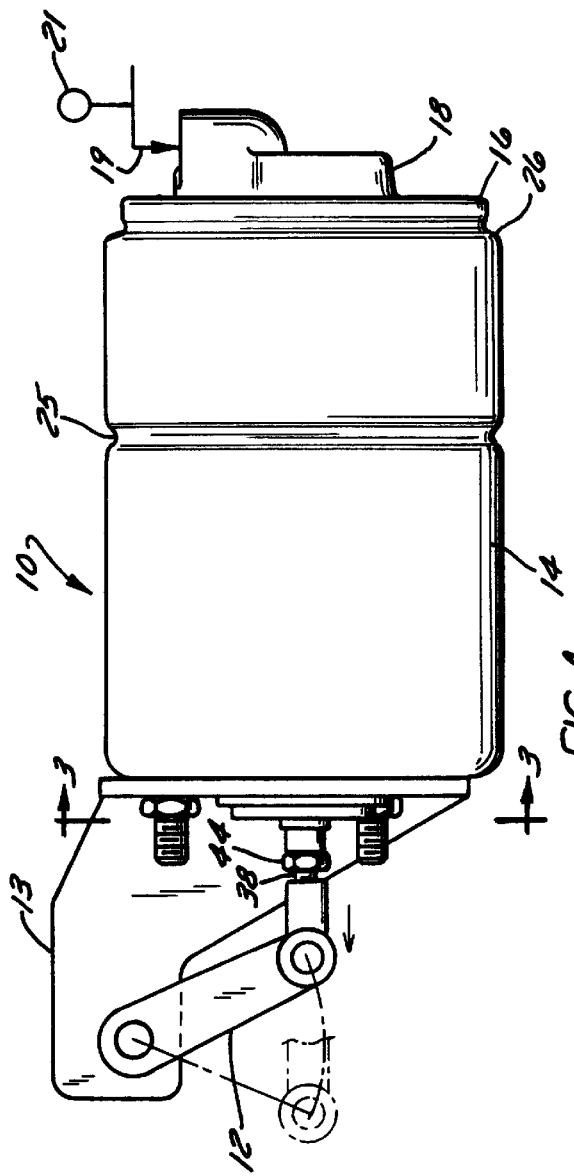
FIG. 1 is a side view of the brake actuator according to the invention.
Figure 2:
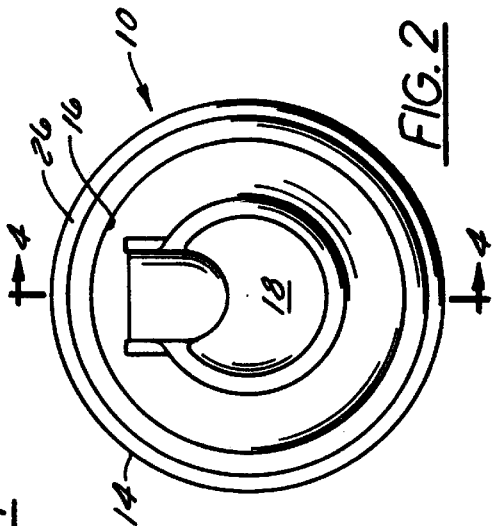
FIG. 2 is an end view of the fluid pressure cap of the actuator.
Figure 3:
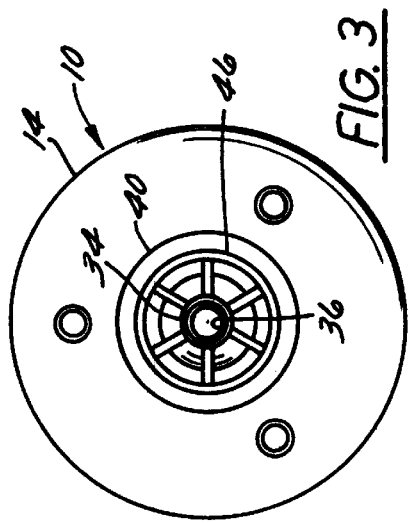
FIG. 3 is a view taken on line 3—3 of FIG. 1.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

The pressure release actuator 10 according to the present invention as shown in FIGS. 1–5 is mounted on a bracket 13 with a pivot arm 12 connected to a lever actuated brake (not shown). The actuator 10 generally includes a cylindrical housing 14 having an opening 16 at one end crimped around the edge of an end cap 18. A cylinder 30 is provided on the inside surface of the end cap 18 which is connected through a passage 19 to the brake pressure line. A pump 21 is provided to maintain the pressure in cylinder 30 as described hereinafter. A piston 28 is positioned in the cylinder 30 and sealed therein by a seal ring 31. A spring plate 22 is provided at the other end of the housing 14. A heavy duty spring 20 is mounted in the housing 14 in abutting engagement with the spring plate 22. A spring cup 24 is positioned in abutting engagement with a crimped section 26 provided around the edge of the end cap 18. A second crimped section 25 is provided in the side wall of the housing 14 in a spatial relation from the section 26 to limit the travel of the cup 24 in the cylinder 14.

Figure 6:
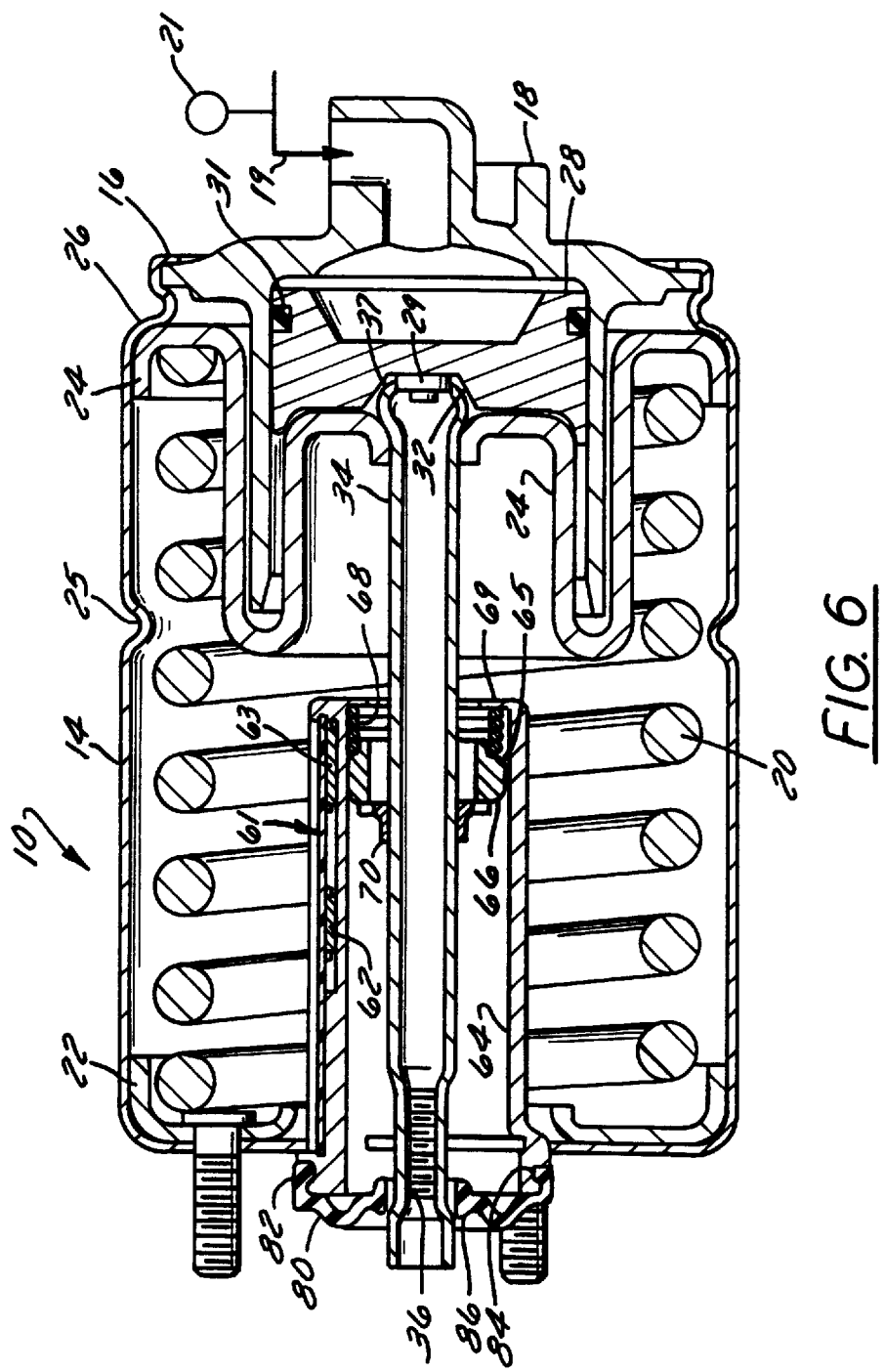
FIG. 6 is a cross section view of an alternate switch arrangement with the brake actuator shown in the loss of pressure position and the magnet in the piston rod overstroked position.

A piston rod 34 having a spherical head 37 is axially aligned in the cylinder 30 formed on the inside of cap 18. The spherical head 37 on the end of the piston rod 34 is aligned with a recess 32 in piston 28. The other end of the piston rod 34 includes an internal threaded section 36 as shown in FIG. 6. A threaded rod 38 is screwed into the threaded section 36 of the rod 34. A tubular plastic member 40 is mounted in an opening 35 in the end of the cylinder 14. A lock nut 44 is mounted on the threaded rod 38 at the end of piston rod 34. One end of the pivot arm 12 is aligned with the opening 35 in the end of the cylinder 14. The spherical head 37 is provided on the other end of the piston rod 34 which is seated in the recess 32 provided in piston 28 and aligned with an opening 39 in the spring cup 24. A rubber spacer 29 is provided in the recess 32 in the piston 28. The outer end of the piston rod 34 is aligned with an opening 45 in a resilient tubular member 46 mounted on the end of tubular plastic member 40. The resilient member 46 allows the outer end of the piston rod 34 to follow the motion of the pivot arm 12.

An electrical switch panel 48 is mounted on the side of tubular member 40 in axial alignment with the axis of the cylinder housing 14. A cylindrical tube 52 is mounted for axial movement on the tubular member 40. The cylindrical tube 52 is biased by means of a spring 54 mounted on the tubular member 40 into abutting engagement with the spring cup 24.

Figures 4, 4A:
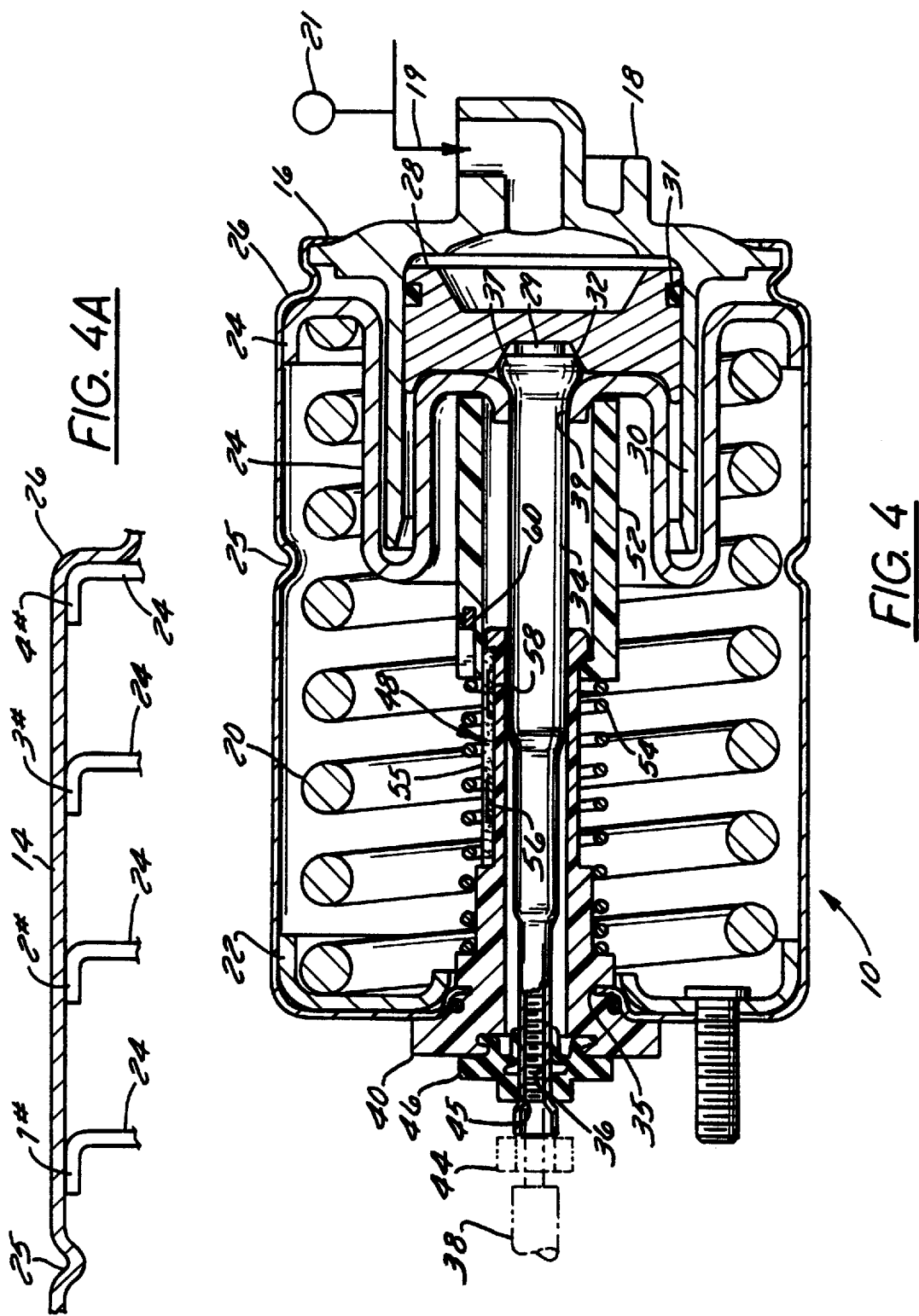
FIG. 4 is a cross section view of the brake actuator taken on line 4—4 of FIG. 2 showing the brake in the loss of pressure position and the magnet located in the piston rod overstroked position.
FIG. 4A shows the sequence of cup positions in the operation of the brake actuator.

Referring to FIG. 4 the tubular member 40 includes a pair of reed switches 56 and 58 mounted in a spaced relation in a plastic strip 55 on the outer surface of the tubular member 40. The cylindrical tube 52 includes a magnet 60 mounted on the end of the tube 52 in axial and circumferential alignment with the magnetic switches 56 and 58. Although magnetic switches have been described, other switches such as mechanical or Hall effect switches could be used.

FIG. 4A is a schematic representation of the positions of the spring cup 24 relative to the housing 14. Position 1 shows the cup in the pump off position. Position 2 shows the pump on position. Position 3 is the normal brake application. Position 4 is the overstroke position.

Figure 5:
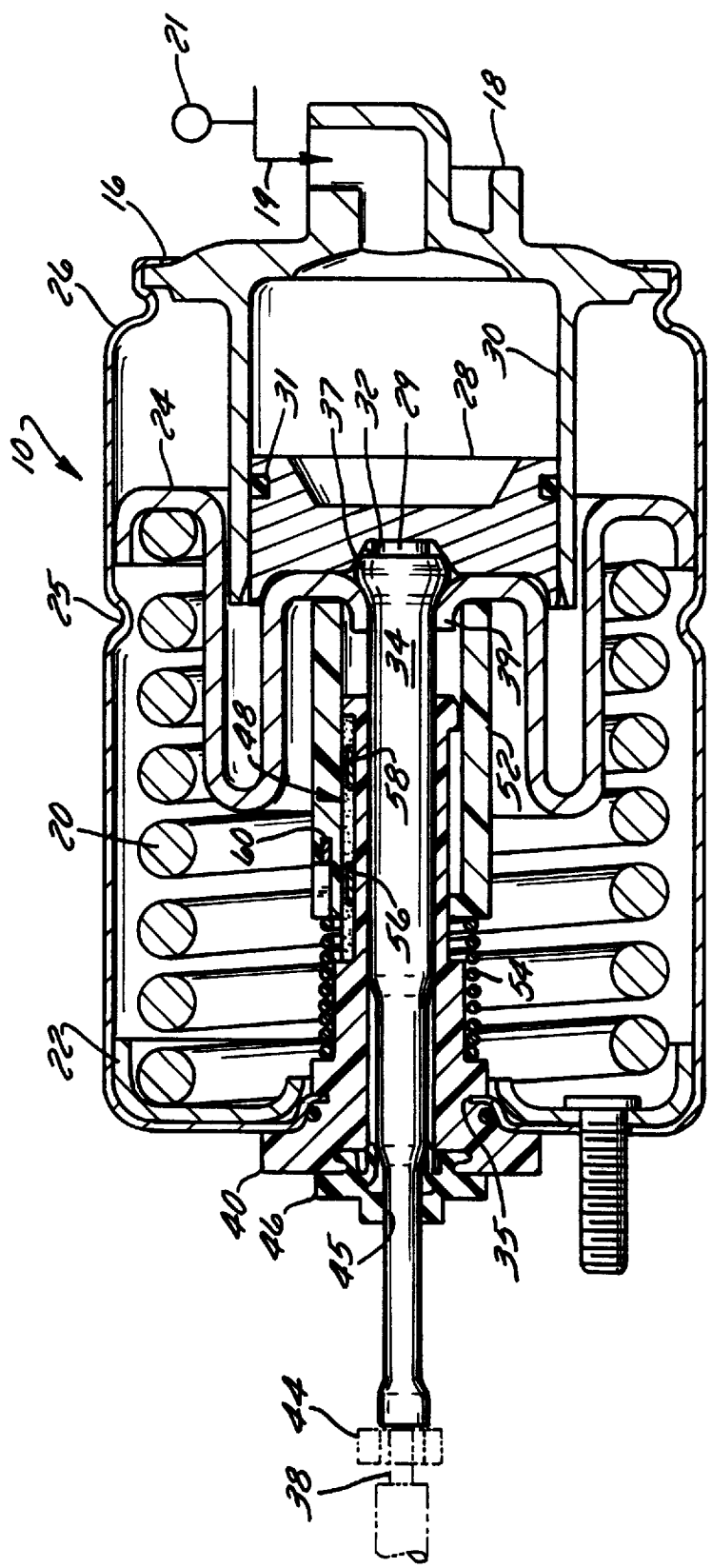
FIG. 5 is a view similar to FIG. 4, showing the switch actuator in the spring compressed, pump off position and the magnet adjacent to the pump off switch.

When the cylinder 30 is pressurized as shown in FIG. 5, the magnet 60 will be located in a position in close proximity to the switch 56 indicating the parking brake off position. Once this position is established the magnet will change the state of the switch 56 turning off the pump 21. If the pressure drops in the cylinder 30 the spring 20 will bias the piston 28 toward the end cap 18 and the spring 54 will bias the tube 52 away from switch 56. As the magnet 60 moves away from the switch 56, indicating a drop in pressure, the switch 56 will change state, turning the pump 21 on to bring the line pressure back up to full pressure. As the pressure increases, the magnet 60 will move toward the switch 56 and change the state of the switch, thus turning off the pump.

In the event the pressure continues to drop because of a leak, the magnet 60 will approach magnetic switch 58 thus changing its state and illuminating the parking brake light in the vehicle indicating to the operator that the brake is on. The light will be turned off if the magnet travels past the magnetic switch 58 indicating excessive stroke in the brake system.

Figure 7:
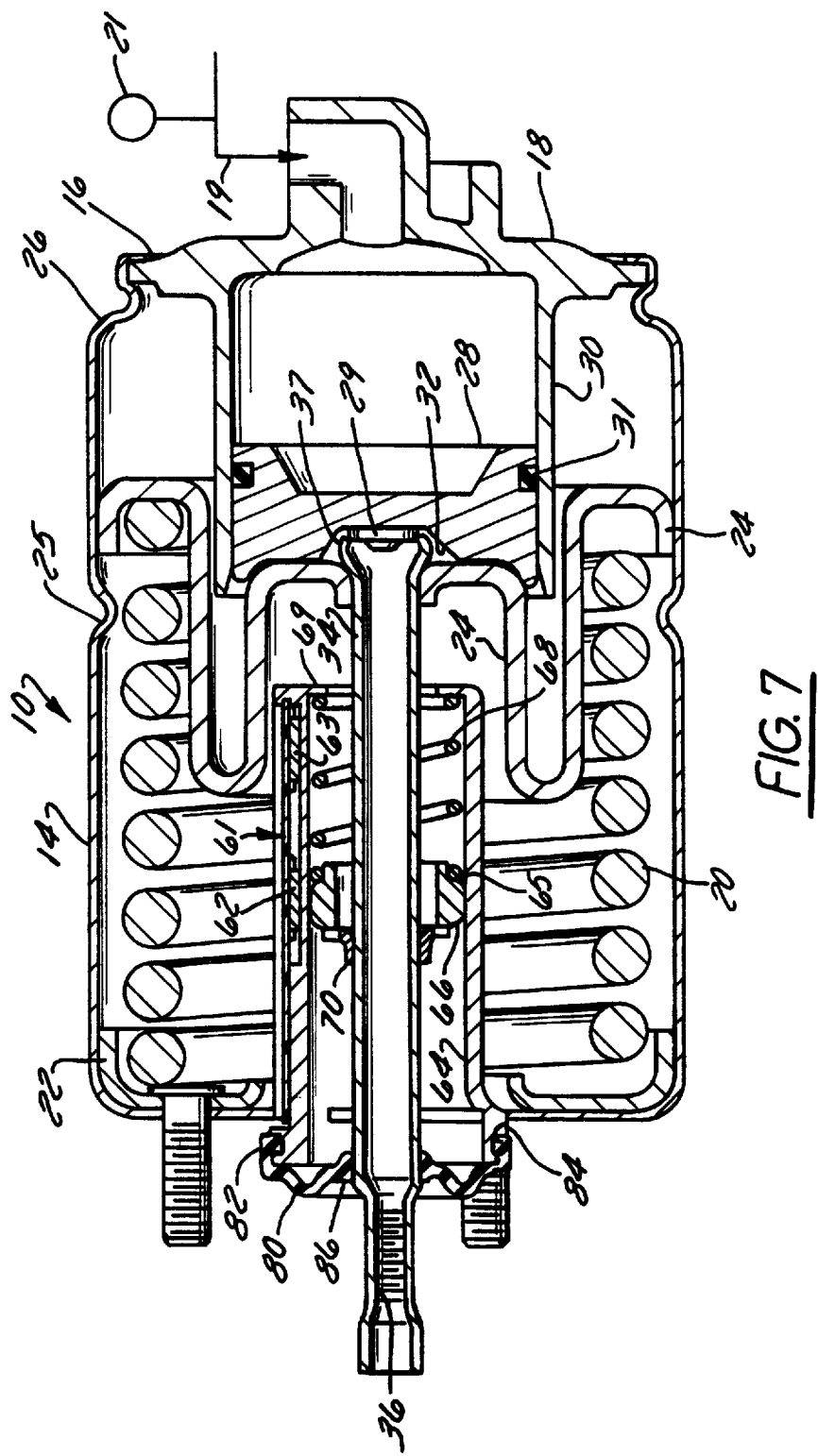
FIG. 7 is a cross section view similar to FIG. 6 showing the spring compressed, pump off position and the magnet adjacent to the pump off switch.

In the alternate embodiment of the invention as shown in FIGS. 6 and 7, magnetic switches 62 and 63 are shown mounted on an electric switch panel 61 which is seated in a groove on the outside surface of a cylindrical member 64. A cylindrical magnet 66 is centered in the cylindrical member 64 in axial alignment with piston rod 34 and the switches 62 and 63. A coil spring 68 is mounted in the cylindrical member 64 with one end seated on a ridge 65 on magnet 66 and the other end seated on a flange 69 formed on the end of the cylindrical member 64. A retainer 70 in the form of a collar is force fit on the outer diameter of the piston rod 34 in a spaced relation to the cylindrical member 64. The spring 68 biases the magnet 66 into abutting relation to the retainer 70 in a fixed position relative to the piston rod 34.

The outer end of the piston rod 34 is supported in the cylindrical member 64 by means of an elastic cap 80 having an outer ring 82 seated in a groove 84 in the end of the cylindrical member 64. The elastic cap 80 also includes a flexible radial section 86 seated on the piston rod 34 which allows the end of the piston rod to follow the arc of travel of the end of the pivot arm 12 but with a generous clearance to the actuating rod allowing a large angular movement of the rod while maintaining close magnet to switch proximity throughout the full stroke of the rod.

Thus, it should be apparent that there has been provided in accordance with the present invention a pressure release parking brake actuator that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. An apparatus for maintaining a spring force to apply a brake in a spring applied hydraulic released brake system, the apparatus comprising:

a housing, a compression spring axially aligned in said housing, a cap mounted on one end of the housing and having a cylinder formed therein, a piston mounted in said cylinder, a spring cup operatively connecting the piston to the compression spring, a piston rod operatively connecting the piston to the brake, a tubular member mounted in the other end of the housing in axial alignment with the piston rod, a cylindrical tube axially aligned with said tubular member and having one end aligned with the spring cup, a spring mounted on said tubular member for biasing said cylindrical tube into engagement with said spring cup, a means for maintaining fluid pressure in the cylinder, a first magnetically actuated switch mounted at one end of the tubular member, and a magnet mounted on said cylindrical tube for actuating the first switch when the pressure drops in the cylinder.

2. The apparatus according to claim 1 including a second magnetically actuated switch mounted on said tubular member and operatively connected to actuate a parking brake light upon application of the parking brake.

3. An apparatus for maintaining a spring force to apply a brake in a fluid pressure controlled brake system, the apparatus comprising:

a housing, a compression spring axially aligned in said housing, a cap mounted on one end of the housing and having a cylinder formed therein, a piston mounted in said cylinder, a spring cup operatively connecting the piston to the compression spring, a piston rod operatively connecting the piston to the brake, a tubular member mounted on the other end of the housing in axial alignment with the piston rod, a cylindrical tube axially aligned with said tubular member and having one end aligned with the spring cup, a spring mounted on said tubular member for biasing said cylindrical tube into engagement with said spring cup, means for maintaining fluid pressure in the cylinder, a pair of magnetically actuated switches mounted in a spaced relation on said tubular member, said tubular member being axially aligned with said cylindrical tube and a magnet mounted on said tubular member located in alignment with said switches whereby said magnet will open one of said switches when the pressure drops to restore system pressure.

4. The brake actuator according to claim 3 wherein said magnet will change the state of the other switch upon application of the parking brake to actuate a parking brake light.

5. A parking brake actuator for activating a parking brake on loss of hydraulic pressure in the actuator, the actuator including:

a housing, a compression spring mounted in the housing, a cap mounted on one end of the housing, a cylinder formed in the cap, a piston mounted in said cylinder, a spring cup operatively connecting the piston to the spring, a piston rod operatively connecting the piston to the brake, a switch arrangement for maintaining the parking brake in an off condition, and means for maintaining fluid pressure operatively connected to the brake system, said switch arrangement including a pair of magnetic switches axially aligned with said piston rod, wherein one of said switches being operatively connected to the means for maintaining fluid pressure in the system, and the other of said switches being connected to actuate a parking brake light indicating application of the parking brake.

6. A brake actuator for maintaining pressure in a brake system and actuating a parking brake light on loss of pressure in the brake system, said actuator comprising:

a hollow cylindrical housing, a compression spring mounted in said housing, a spring cup mounted in said housing on one end of said spring, a hydraulic piston and cylinder assembly mounted on said one end of the housing in operative engagement with said spring cup, and a piston rod having one end operatively connected to said spring cup and the other end connected to a pivot arm for a lever actuated brake, said spring being operatively connected to bias said piston rod to a parking brake applying position on loss of pressure in said system and a magnetically actuated switch assembly for maintaining pressure on the brake, wherein said switch assembly includes a first magnetic switch for activating a means for maintaining fluid pressure on sensing a drop in pressure in the system and a second switch for actuating a parking brake light on loss of pressure in the system indicating application of the parking brake.

* * * * *